United States Patent [19]

Astle

[11] Patent Number: 4,909,114

[45] Date of Patent: Mar. 20, 1990

[54] PANEL SAW APPARATUS

[75] Inventor: William H. Astle, Rancho Cordova, Calif.

[73] Assignee: Tri Tool Inc., Rancho Cordova, Calif.

[21] Appl. No.: 213,939

[22] Filed: Jun. 30, 1988

[51] Int. Cl.⁴ .......................................... B23D 45/12
[52] U.S. Cl. .................................... 83/745; 83/471.2;
       83/485; 83/490; 83/529; 83/564; 83/574
[58] Field of Search ................. 83/745, 574, 490, 485,
       83/547, 471.3, 477.1; 29/157.3 R, 157.4, 402.08,
                           402.09, 402.11; 188/67, 110

[56]                References Cited
            U.S. PATENT DOCUMENTS

| | | |
|---|---|---|
| 831,055 | 9/1906 | Gilmore ................................ 188/67 |
| 991,241 | 5/1911 | Rae ...................................... 188/67 |
| 2,014,229 | 9/1935 | Emmons ............................ 125/13 R |
| 2,097,430 | 10/1933 | Brown . |
| 2,364,879 | 1/1942 | Talboys et al. . |
| 2,589,554 | 3/1952 | Killian . |
| 2,596,524 | 5/1952 | Bridwell ........................... 83/574 X |
| 2,673,725 | 3/1954 | Coates . |
| 2,834,435 | 5/1958 | Vanderbeck ...................... 188/67 X |
| 2,921,492 | 1/1960 | Worth . |
| 3,046,707 | 7/1962 | Obear . |
| 3,254,455 | 10/1963 | Hensley . |
| 3,421,266 | 1/1969 | Schanafelt et al. . |
| 3,688,615 | 9/1972 | Protze et al. ......................... 82/70.2 |
| 3,722,497 | 3/1973 | Hiestand et al. ...................... 125/14 |
| 4,131,046 | 12/1978 | Strohmeyer ....................... 83/471.2 |
| 4,633,555 | 1/1987 | Legge ................................ 29/157.4 |
| 4,739,688 | 4/1988 | Brennan et al. ....................... 83/745 |

FOREIGN PATENT DOCUMENTS

742513   6/1980   U.S.S.R. .

Primary Examiner—Frank T. Yost
Assistant Examiner—Rinaldi Rada
Attorney, Agent, or Firm—Bacon & Thomas

[57] ABSTRACT

A panel saw apparatus for cutting a straight line in a planar surface such as a boiler tube panel includes a guide rail arranged to be secured to the panel surface in a predetermined position and a cutting assembly mounted on the rail for movement along the rail. The cutting assembly includes a carriage mounted on the rail for movement along the rail, a brake for holding the carriage in a desired position relative to the guide rail during cutting operations, a cutting tool and tool housing pivotally mounted on the carriage and arranged to pivot toward the panel surface to enable a cutting tool covered by the housing to serially plunge cut a straight line in the surface, and a securing means for holding the cutting tool in various positions of rotation relative to the carriage. The brake is arranged to be automatically actuated and released by pivotal movement of the tool housing towards and away from its cutting position.

14 Claims, 5 Drawing Sheets

PANEL SAW APPARATUS

BACKGROUND OF THE INVENTION

The present invention concerns an apparatus of serially plunge cutting boiler tubular panels or walls. Specifically, the present invention concerns a panel saw for plunge cutting boiler tubular panels formed from a series of parallel tubes joined side by side, and connected by webs usually in a single plane.

Tubular walls formed from a plurality of parallel tubes welded together side by side usually with connecting webs of metal are used in various heat exchanger environments. One such environment is a boiler in a steam driven electrical power generating plant, where the tubes are arranged to form a continuous fluid circuit. Water is run through the tubes and is heated by the burning fuel of the boiler to generate steam which powers electrical turbo generators. The steam generated by the water heated in the boiler tubular walls is used to run electric turbines for generating electricity.

The tube walls of such boilers are generally of such a large scale that should an area of the tube wall become damaged, it is not economically feasible to replace the entire tube wall. Rather, the section of the tube wall which contains the damaged tubes is usually removed and replaced by welding in a new section of tube wall with dimensions that correspond to the dimensions of the removed section of wall.

In accordance with the prior art, the section of the damaged tube wall may be removed manually by using hand-held power saws or torches to cut out a rectangular section which includes the damaged tubes by cutting two parallel spaced apart horizontal lines and two parallel spaced apart vertical lines through the tube wall. However, this method of cutting and removing the damaged section of the wall is time consuming and the parallel cuts made by hand-held power tools or torches is often rough and inaccurate, making it difficult to properly dimension a new section of tubular wall to replace the damaged section removed. Moreover, the cut edge is not even and the working conditions for the saw or torch operator make it difficult to be precise.

Other cutting systems are known in the prior art which provide a guide means for panel saws that can be secured directly to the tube wall to provide an accurate cut line. In one such device, a saw is slidably mounted on the guide means for movement therealong. As the saw is moved along the guide means, it cuts a line in the tube wall parallel to the guide means, following which the guide means can then be removed and repositioned to cut additional lines in the wall to enable removal of a section of the damaged tube wall. Because the guide permits a precise straight line to be made, a new section of tube wall can be accurately dimensioned to replace the section of tube wall removed. This type of system is described, for example, in U.S. Pat. No. 4,633,555 granted to G. A. Legge.

However, this apparatus for making a straight cut through the tube wall also has several disadvantages. Because the saw is supported for making a running cut, substantial manual effort is involved in pushing the saw into the panel and along the guide rail to penetrate the panel and make the cut. Should the saw require servicing, the saw must be disassembled from the guide, making servicing the saw difficult and time consuming.

An additional device that is known in the art includes a panel saw for repairing boiler tube walls that is slidably mounted on a guide rail and which pivots in a direction towards and away from the tube wall to make a series of plunge cuts in the wall. This device produces a faster and more precise cut, requires less operator effort, but uses a manually secured brake system to secure the panel saw to the guide way. Such a system is described in U.S. Pat. No. 4,739,688 granted to M. T. Brennan et al.

In this system the brake means must be engaged manually at each cut position and the manually released to move the panel saw to the next cutting position. The additional steps of manually engaging and releasing the brake add to the overall time and effort involved in making the complete straight line cut through the tube wall. In addition, the device of U.S. Pat. No. 4,739,688 includes a complex linkage and lock arrangement for guiding the saw in a plunge cut and for locking the saw against pivotal movement.

SUMMARY OF THE INVENTION

The apparatus of the present invention is intended to overcome the problems in the prior art devices. Specifically, the panel saw system of this invention includes a guide rail which can be secured directly to the tube panel along the line of the desired cut to be made and on which is mounted a plunge cutting saw for sliding movement along the rail to any position on the rail for serially plunge cutting the wall along a straight line.

The plunge cutting saw is pivotally mounted on a carriage that engages the guide rail via rollers mounted on the carriage. The saw pivots preferably to three positions relative to the guide rail; a first, or cutting, position where the panel saw is closest to the guide rail and the cutting tool (i.e., the disk or saw blade of the saw engages the panel to be cut); a third, or maintenance, position where the panel saw is pivoted away from the guide rail to its furthest extent to store the saw or for maintenance; and a second, or traversing movement, position intermediate to the first and third positions where the panel saw is located during traversing movement of the cutting means along the guide rail to another selected cutting position.

The saw system of the invention includes a brake means arranged to automatically secure the panel saw in its cutting or storage position along the guide rail when the saw is moved away from its traversing position towards its cutting position or its maintenance position, and a securing means which locks the saw against pivotal movement at the two positions of maintenance and traversal movement.

BRIEF DESCRIPTION OF THE DRAWINGS

The above objectives of the present invention along with additional advantages and features will be readily apparent from a consideration of the description of the preferred embodiment and the following drawings in which.

DESCRIPTION OF THE PREFERRED EMBODIMENT

Figure 1:
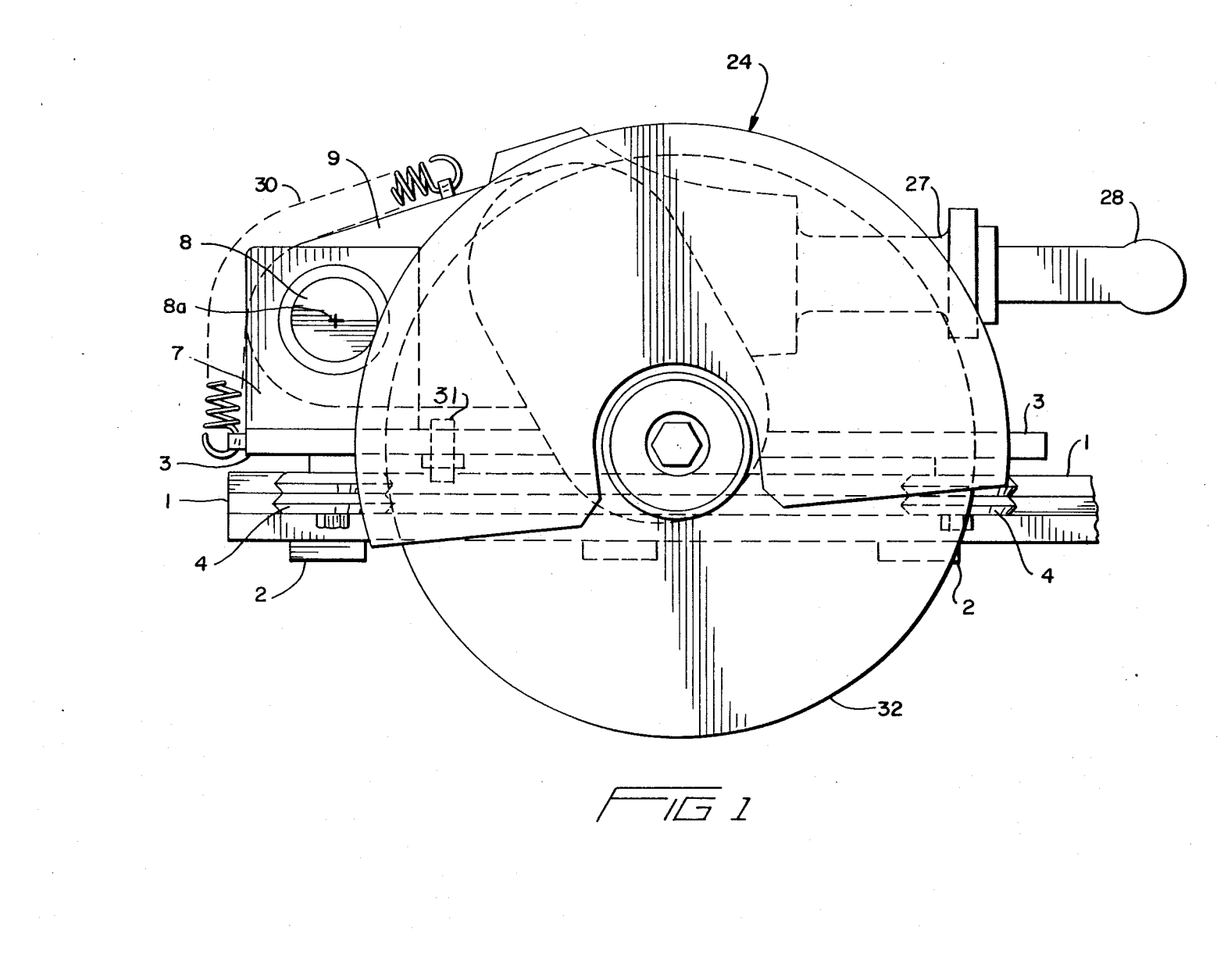
FIG. 1 is a side elevational view of the cutting means showing the panel saw, the carriage and the guide rail.

Referring to FIG. 1, there is shown the tube panel cutting means of the present invention. The cutting means includes a guide rail 1 of a predetermined length depending on the length of the desired cut. Weld tabs 2 preferably are fixed to the underside of the guide rail and affixed to a metal tube wall to be cut for example as by spot welding. Usually, a minimum of two weld tabs 2 are required, longitudinally spaced along the rail. However, more weld tabs may be employed in order to prevent deflection of the guide rail during the cutting operation and to better secure the saw. Other means may be employed to secure the guide rail to the cutting surface, and it is not intended that the scope of the present invention be limited by the disclosed specific weld tabs illustrated in the preferred embodiment for securing the guide rail to the workpiece surface.

Figure 3:
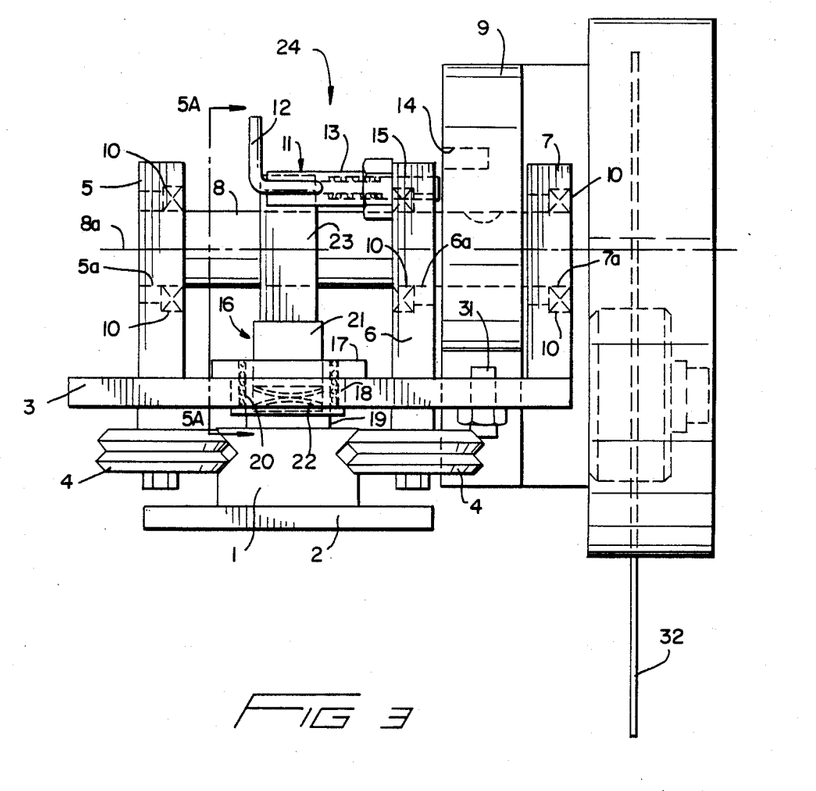
FIG. 3 is a rear elevational view showing the securing means and a section view of the brake means.
Figure 4:
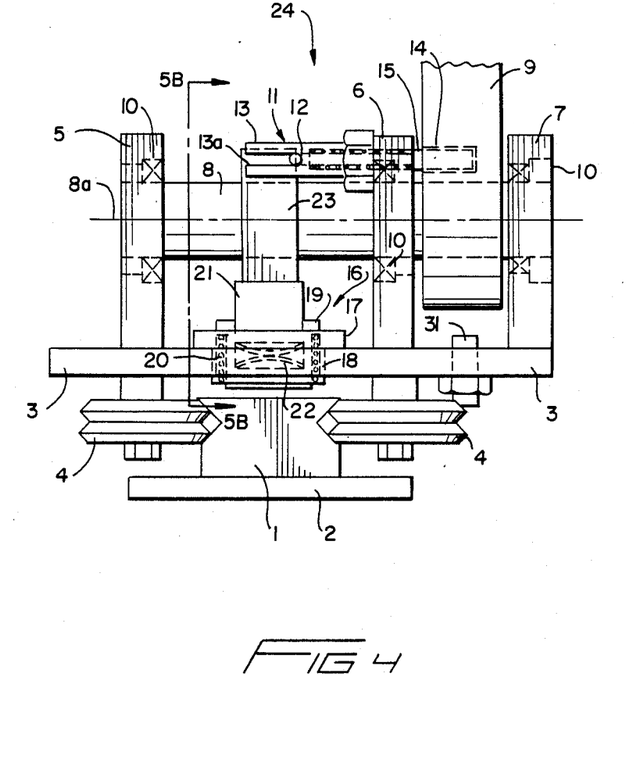
FIG. 4 is a segmented rear elevational view showing a section view of the securing means and the brake means in a disengaged position.

The cross-section of the guide rail is shown in FIGS. 3 and 4 which also shows the rollers 4 for supporting and guiding the panel saw to be described relative to the rail 1. The particular cross section of the guide rail 1 was chosen to precisely guide the cutting tool, and to prohibit the rollers 4 from separating from the guide rail 1 (except endwise), while permitting rolling contact between the rollers 4 and the guide rail 1 along the length of the guide rail. Other cross sectional configurations of the guide rail may be employed which could perform the same function without departing from the scope of the invention.

A carriage 3 carries rollers 4 and is supported for movement along the rail a suitable distance above the rail by means of the rollers, as best seen in FIGS. 3 and 4. The rollers 4 hold the carriage 3 to the guide rail 1 while permitting sliding of the carriage 3 along the rail. As best seen in FIGS. 1, 3 and 4, two rollers 4 are positioned at each end of the carriage 3 to support the carriage on the rail 1. Should the carriage 3 require additional support, additional rollers 4 could be added to the carriage 3.

A set of three pivot shaft supports 5, 6, 7 are connected to the carriage at one end on the front or top side of the carriage. The three supports 5, 6, 7 extend in a direction generally perpendicular to front side of the carriage 3. Each of the three supports 5, 6, 7 has a coaxial aperture 5a, 6a, and 7a bored therethrough which receive a bearing 10 for rotatably supporting a pivot shaft 8 extending through the bores. The shaft 8 is fixed to the panel saw housing 9 by suitable means, such as a set screw system or a key. The bearings 10 and panel saw pivot shaft 8 together pivotally mount the panel saw housing 9 to the carrier 3 to permit pivoting of the panel saw away from and toward the plane of the carriage 3 and the surface to be cut about pivot axis 8a. Although three supports 5, 6, 7 are shown, more supports, fewer supports, or different types of supports may be employed without departing from the scope of the invention.

A panel saw antirotation locking means 11 is secured in a bore 15 in one of the supports 6 adjacent the panel saw housing 9. The locking means 11 comprises a cylindrical housing 13 with a groove 13A cut therein The cylindrical housing 13 receives a spring biased pin 12. The pin 12 is spring biased to engage in one of two bores 14a, 14b in the saw housing 9. In the position of pin 12 shown in FIG. 3, the pin 12 is rotated away from the groove 13a and does not engage in either of the bores 14a, 14b in the panel saw housing 9. In the position shown in FIG. 4, the pin 12 has been rotated to be received in the groove 13a in the cylindrical casing 13 of the securing means. In this position, the pin 12 is biased to move in a linear direction along the axis of the pin and engage in one of the two bore holes 14a, 14b in the panel saw housing 9. The panel saw securing means is used to secure the panel saw in one of two pivotal positions as will be fully explained later with reference to FIGS. 5A through 5C.

An important feature of the invention is the automatic brake system 16. The brake system includes, in accordance with a preferred embodiment, a spring sleeve 17, carried by carriage 3 and that extends through an aperture 18 in the carriage 3 at a point adjacent the guide rail 1. A brake shoe 19 is slidably received in this sleeve and is biased normally in a direction away from the guide rail 1 by a spring 20. A connecting brake actuator rod 21 is slidably received within the brake shoe 19. The connecting rod 21 transmits actuating motion to the brake shoe 19 through the Belville springs 22, for urging the brake shoe 19 in a direction toward the guide rail 1 in a manner to be fully explained later. When the brake shoe 19 contacts the guide rail 1, the friction force between the two contacting surfaces acts as a brake for locking or securing the carriage in its existing position relative to the guide rail 1.

A brake actuating cam 23 is secured to the pivot shaft 8 for rotation with the shaft and the saw housing 9. The cam surface 23a is configured so that, as the cam 23 is rotated to a maintenance or cutting position from a traverse position (See FIG. 5), the connecting rod 21 of the brake means 16 is urged as a cam follower in a linear direction toward the guide rail 1 by the cam surface. The movement of the connecting rod 21 towards the guide rail 1 causes the brake shoe 19 to be moved via spring washers 22 so as to engage the guide rail 1, thereby braking the carriage 3 relative to the guide rail 1. The Belleville springs 22 provide for lost motion between actuator rod 21 and the brake shoe 19 (i.e., part of the movement of rod 21 is not directly transmitted to shoe 19; i.e., some motion is "lost" at the Belleville springs 22). The operation of the cam 23 and the braking means 16 will also be explained later with reference to FIGS. 5A through 5C.

Figure 2:
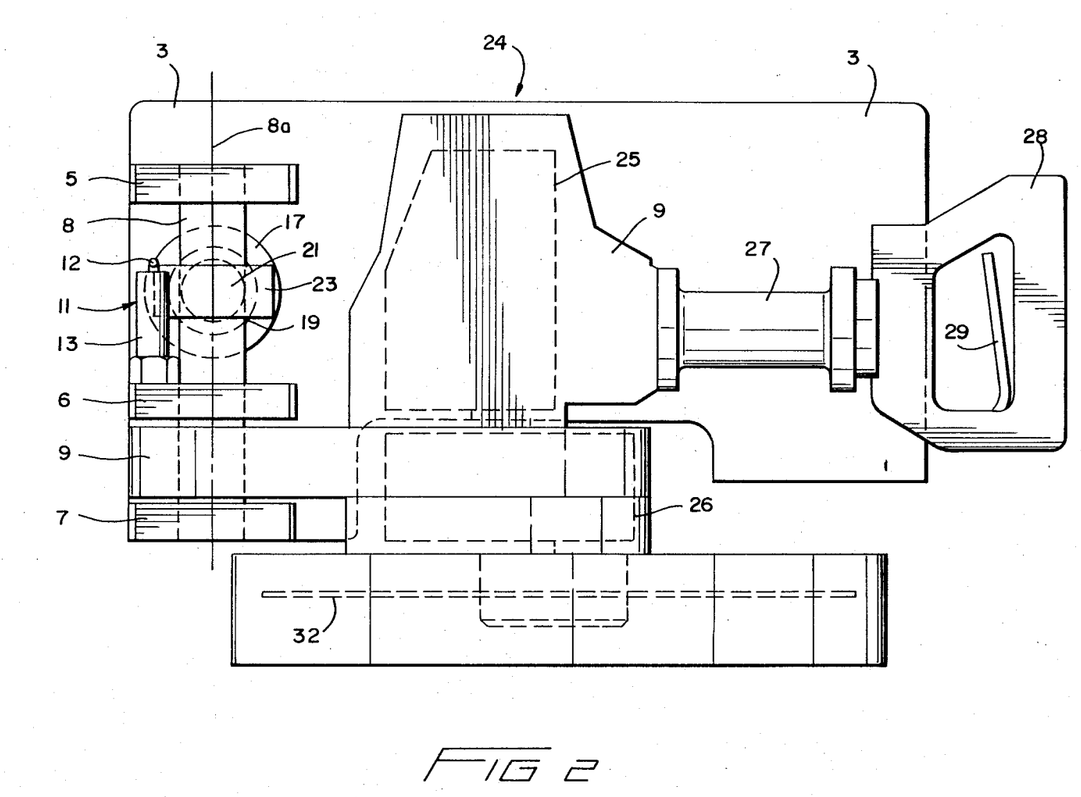
FIG. 2 a plan view of the cutting means showing the operator handle lever and portions of the securing means and the brake means.

Referring to FIGS. 1 and 2, the panel saw tool 24 is shown. The panel tool 24 comprises a housing 9 which houses the panel saw motor 25 which may be of any suitable type and a drive means 26 that transmits the rotary output of the motor 25 to the panel saw cutting disk or tool 32. The tool 24 is pivotally mounted to the carriage 3 by the pivot shaft 8 as explained earlier, which also rotates with the tool housing. Tool 24 preferably is capable of pivoting to three positions relative to the carriage 3 and the surface to be cut, and is movable along with the carriage 3 along the length of the guide rail 1. An operator lever 27 and handle 28 extend from an end of the panel saw housing 9 opposite the panel pivot shaft 8. The leverage provided by the lever 27 and the handle 28 assists the panel saw operator in pivoting the panel saw to its first cutting position and its other positions relative to the carriage 3. A spring 30 (best seen in FIG. 1) also assists the operator in pivoting housing 9 the away from its cutting position and towards its traverse and maintenance positions. The leverage provided by the lever 27 and the handle 28 also multiplies the force applied by the operator on the handle 28 when pivoting the panel saw 24 downward to its cutting position.

Unlike prior art devices, the panel saw tool of the present invention preferably does not perform a primary straight line cut by positioning the tool in its cutting position relative to the carriage while the carriage is traversed along the guide rail 1. Rather, the tool of the present invention preferably is positioned along the guide rail, is automatically braked, and is pivoted downwardly toward its plunge cutting position, causing the blade 32 to first come into contact with the surface to be cut in a plunge cut direction. As additional rotational force is exerted by the operator on the handle 28, the panel saw blade 32 plunges through the tubular surface to be cut and continues to cut until the blade reaches its full desired cut depth. A series of connected plunge cuts are then made repeatedly while traversing the saw rail along desired cut line. An adjustable stop means 31 limits the maximum depth of plunge of the saw blade 32 into each cut. In FIG. 2, a switch 29 is shown in the handle for operation of the panel saw motor 25. The switch 29 is located in the operator handle 28 for convenience, but may be located elsewhere.

Figures 5A, 5B:
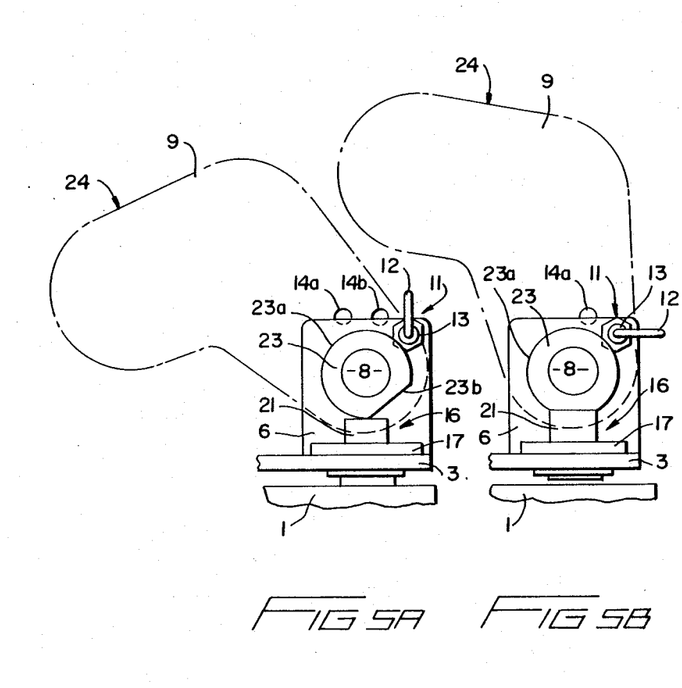
FIGS. 5A, 5B, and 5C shows schematic representations of the three positions of the cutting means along with the corresponding positions of the brake means and the saw securing means.
Figure 5C:
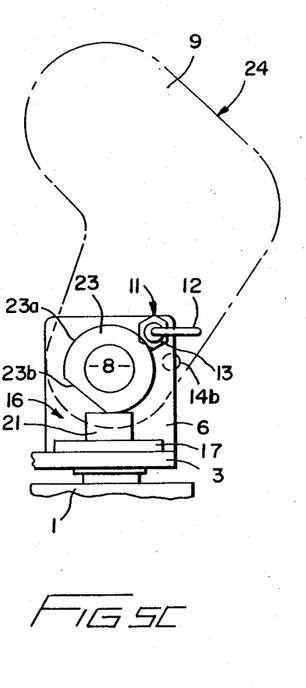

With Reference to FIGS. 5A through 5C, the operation of the panel saw tool 9, the panel saw securing means 11 and the panel saw brake means 16 will be explained. FIGS. 5A through 5C schematically show three preferable operative positions of the panel saw tool. FIG. 5A shows a first or cutting position of the panel saw, FIG. 5B shows second or intermediate movement position of the saw and FIG. 5C shows a third or maintenance position of the saw.

In FIG. 5C the saw housing 9 is shown pivoted to its furthest extent away from the carriage 3 and the surface to be cut. In this position, the first bore hole 14a in the saw housing 9 lines up with the bore 15 in the support 6 accommodating the saw securing means 11. The pin 12 of the panel saw securing means 11 is shown in FIG. 5C in its engaged position where it is rotated to engage in the groove 13A of the securing means 11. In this position the pin 12 is biased toward the first bore hole 14A in the panel saw housing 9 and engages this bore hole 14a to secure the panel saw housing in its maintenance position pivoted away from the carriage 3.

As previously described, the panel saw pivot shaft 8 is also fixed to the panel saw housing 9 and rotates with the housing in a clockwise direction viewed in FIG. 5C from the cutting to the maintenance position. The cam 23, fixed to the pivot shaft 8 also rotates in a clockwise direction causing the cam surface 23a to gradually depress the rod 21 towards the brake shoe 19. This causes the brake shoe 19 to be depressed via the springs in sleeve 17 and into contact with the guide rail 1. By the friction force between the brake shoe 19 and the guide rail 1, the carriage 3 and the panel saw housing 9 are automatically braked in their relative position to the guide rail 1 simply by rotating the panel saw housing 9 from its traverse position (FIG. 5B) to the cutting and maintenance positions (FIGS. 5A and 5C). The panel saw may be secured against rotation by the securing means 11 in its maintenance position with the carriage braked to the guide rail 1 to facilitate the performance of maintenance on the panel saw, or just to secure the saw in a position on the guide rail 1 when not in use.

To move the panel saw from its secured maintenance position to one of the other two positions, the pin 12 of the securing means 11 will first be manually retracted from the first bore hole 14A and preferably rotated away from the securing means groove 13A to its disengaged position. The panel saw 9 and shaft 8 are then free to pivot about the rotational axis of the shaft 8.

Pivoting the panel saw housing 9 counterclockwise from its third or maintenance position as shown in FIG. 5C brings it to the intermediate or traverse movement position (FIG. 5B). In this position, the second bore hole 14b lines up with the pin 12 of the securing means 11. When the pin 12 is rotated to its engagement position and engages in the groove 13A of the securing means 11, the pin 12 is biased toward the second bore hole 14b in the panel saw housing 9 and engages in this bore hole 14b to secure the panel saw in its intermediate or traverse movement position. As the panel saw is rotated from the maintenance position to the traverse movement position, the cam 23 secured to the pivot shaft 8 is also rotated counter clockwise until that portion 23b of cam surface 23a having the smallest cam offset engages the connecting rod 21. In this position of the panel saw housing 9 and the cam 23, the spring 20 urges the brake shoe 19 and the connecting rod 21 away from the guide rail 1, and the carriage 3 along with the panel saw 9 are now free to traverse along the guide rail to the next cutting position.

When the carriage 3 and the panel saw housing 9 are to be moved by traversing to the next cutting position, the panel saw securing means 11 is released. The pin 12 of the securing means 11 is pulled along its axis against the bias to retract the pin 12 from the bore hole 14b in the panel saw housing 9. The pin 12 is then rotated away from the securing means groove 13a to a disengaged position and released. The panel saw may now again be freely pivoted about the axis 8a of the pivot shaft 8 between the maintenance position (FIG. 5C) the traverse position (FIG. 5B) or the cutting position (FIG. 5A).

In pivoting the panel saw from, for example, the traverse or maintenance positions, to the cutting position, the panel saw housing 9 is rotated forward or counterclockwise as seen in FIG. 5A until the cutting tool blade 32 contacts the surface to be cut. The securing means 11 remains disengage because the panel saw must be free to pivot forward as the cut of the panel surface progresses. As the panel saw is pivoted to its initial cut position, the cam 23 is also rotated counterclockwise about the pivot shaft axis automatically (and without specific manual intervention or actuation other than pivoting the saw housing) causing the cam surface to again gradually depress the connecting rod 21 as it did when the panel saw was rotated to its maintenance position. The depression of the connecting rod 21 by the cam 23 causes the brake shoe 19 to engage in frictional contact with the guide rail 1, and brake the carriage 3 relative to the guide rail 1. In this manner the carriage 3 is held stationary in its relative position along the guide rail 1 throughout the cutting operation. As the panel saw is rotated forward about the pivot shaft 8 axis by the operator moving the handle 28 downward, the cutting tool 32 continues to cut through the plane surface until it reaches its maximum cut depth and the panel saw housing 9 abuts against the adjustable stop means 31 (FIG. 1). At this point the cut to be made in this surface by the panel saw 9 at its position along the guide rail 1 is complete. The panel saw housing 9 is then pivoted backwards to its intermediate traversing position and is pivotally secured in place by the lock pin 12. The housing 9 and carriage 3 may then be moved along the guide rail 1 to the next position on the guide rail where another plunge cut is to be made to extend the previous cut along the desired straight line cut direction through the panel. The saw also could be pivoted to its maintenance position and secured there.

To summarize the operation of the panel saw cutting tool of the present invention, first a desired straight cut line in the planar tube wall surface to be cut is determined. The guide rail 1 of the cutting means is then placed on the panel surface parallel to the desired cut line and spaced from the desired cut line a sufficient distance to line up the panel saw blade 32 with the desired cut line. The weld tabs 2 are then welded to the tube panel surface to secure the guide rail 1 in place. The carriage and saw are then mounted on the guide rail, for example by siding same over the end of the rail. Usually, the saw is secured against pivotal motion by securing means 11. The operator then releases the securing means 11, pivots the panel saw housing 9 to its traverse position (and if desired reengages the securing means 11 to hold the panel saw in this position relative to the carriage 3) while the carriage 3 is slid along the guide rail 1 to the position for the first cut. The operator then (after releasing the securing means 11) pivots the panel saw housing 9 downward to the initial cut position where the saw blade 32 just engages the surface to be cut, thereby automatically engaging the brake means 6 and prohibiting further movement of the carriage 3 along the guide rail 1. The trigger 29 is depressed by the operator and the cutting operation begins. When the cutting blade 32 has cut through the panel to a desired depth, the downward pivoting movement of the panel saw housing 9 is stopped by its abutting against the stop means 31 or simply by the operator. The saw 9 is then pivoted back (and if desired secured in its intermediate movement position by the operator) and slid along the guide rail 1 to the next cut position. The second cut in the surface is then made. This process is repeated along the length of the guide rail until the desired cut in the panel is made. Additional straight line cuts are usually made in the panel to form the rectangular configuration of the panel section to be removed. Of course, any desired configuration of guide rail and cut line could be used with the invention. The cut section is then removed and replaced with a new section having essentially the same dimensions as the removed section, and the new section is then welded in place completing the repairs.

While a preferred embodiment of the invention has been shown and described herein, it should be understood that the invention is not intended to be limited thereby, but may be embodied and practiced by any means within the scope of the following claims.

What is claimed:

1. Panel saw apparatus for serially plunge cutting into a panel workpiece surface to cut a straight line comprising:
    a guide rail arranged to be removably secured to a workpiece surface in a predetermined position relative to a desired straight line of cut;
    a carriage mountable on said guide rail for engagement with and movement along said guide rail;
    a cutting means including a rotary disk cutting tool and a tool drive means pivotally mounted on said carriage, said cutting means arranged to pivot between a first or cutting position and at least a second position where the cutting tool is located away from the workpiece surface; and
    a brake means carried by said carriage and operatively connected to said cutting means, said brake means including means arranged to be automatically actuated upon pivotal movement of the cutting means so as to prevent movement of said carriage relative to said guide rail when said cutting means is pivoted to its first position, and to be deactivated so as to permit such movement of the carriage relative to the guide rail when the cutting means is pivoted to its second position;
    said brake means comprising a cam means operatively connected to said cutting means to move in a response to pivotal movement of said cutting means to at least a first and second position corresponding to the first and second position of said cutting means;
    a brake actuating element arranged to be moved by said cam element;
    a locking element arranged to be driven by said brake actuating element to cause engagement of said brake means to prevent movement of said carriage relative to said guide rail upon pivotal movement of said cutting means;
    said locking element comprising a brake shoe mounted on said carriage for motion toward and away from said rail;
    said brake actuating element comprises a connecting rod cam follower arranged to transmit cam motion between said cam means and said brake shoe;
    said brake shoe including a cylindrical cavity and compression spring means received in said cavity;
    said rod follower slidably received in said cavity with one end of said rod engaging said compression spring means and the other end of said rod slidably engaging said cam element, whereby motion of the cam element is transmitted to the brake shoe through the compression spring.

2. Panel saw apparatus as claimed in 1, comprising:
    a securing means arranged to releasably secure said cutting means against pivotal motion relative to said carriage at least at said second pivot position of said cutting means.

3. Panel saw apparatus as claimed in claim 2, wherein said cutting means includes a tool housing and said securing means comprises:
    a pin means for securing said cutting means carried by the carriage, said pin means having a longitudinal axis and arranged to secure said cutting means in its second position relative to said one parallel support and said carriage when said pin means is moved along its axis from a first disengaged position to a second engaged position;
    an aperture in the housing of the cutting means, said aperture extending parallel to the pivot axis of the cutting means and coaxial with said pin axis when said cutting means is pivoted to said second position;
    said pin means engaging said aperture when said pin means is moved to said second engaged position.

4. Apparatus as claimed in claim 1, said cutting means supported on said carriage for pivotal movement to a third position further remote from the workpiece surface than said second position; said brake means arranged to be automatically actuated upon pivotal movement of the cutting means to said third position from said second position so as to prevent movement of said carriage relative to said guide rail when said cutting means is pivoted to said third position from said second position.

5. Apparatus as claimed in claim 4, including securing means for retaining the cutting means at said third position.

6. Panel saw apparatus for serially plunge cutting into a panel workpiece surface to cut a straight line comprising:
   a guide rail arranged to be removably secured to a workpiece surface in a predetermined position relative to a desired straight line of cut;
   a carriage mountable on said guide rail for engagement with and movement along said guide rail;
   a cutting means including a rotary disk cutting tool and a tool drive means pivotally mounted on said carriage, said cutting means arranged to pivot between a first or cutting position and at least a second position where the cutting tool is located away from the workpiece surface; and
   a brake means carried by said carriage and operatively connected to said cutting means, said brake means including means arranged to be automatically actuated upon pivotal movement of the cutting means so as to prevent movement of said carriage relative to said guide rail when said cutting means is pivoted to its first position, and to be deactivated so as to permit such movement of the carriage relative to the guide rail when the cutting means is pivoted to its second position;
   a securing means arranged to releasably secure said cutting means against pivotal motion relative to said carriage at least at said second pivot position of said cutting means;
   said securing means comprising a pin means having a longitudinal axis carried by the carriage and axially moveable between a first disengaged position and second engaged position;
   an aperture in the housing of the cutting means, said aperture extending parallel to the pivot axis of the cutting means and coaxial with said pin axis when said cutting means is pivoted to said second position;
   said pin being arranged to secure said cutting means in its second position relative to said one parallel support and said carriage when said pin is moved from its first disengaged position to its second engaged position.

7. Panel saw apparatus for serially plunge cutting into a panel workpiece surface to cut a straight line comprising:
   a guide rail arranged to be removably secured to a workpiece surface in a predetermined position relative to a desired straight line of cut;
   a carriage mountable on said guide rail for engagement with and movement along said guide rail;
   a cutting means including a rotary disk cutting tool and a tool drive means pivotally mounted on said carriage, said cutting means arranged to pivot between a first or cutting position and at least a second position where the cutting tool is located away from the workpiece surface; and
   a brake means carried by said carriage and operatively connected to said cutting means, said brake means including means arranged to be automatically actuated upon pivotal movement of the cutting means so as to prevent movement of said carriage relative to said guide rail when said cutting means is pivoted to its first position, and to be deactivated so as to permit such movement of the carriage relative to the guide rail when the cutting means is pivoted to its second position;
   said cutting means supported on said carriage for pivotal movement to a third position further remote from the workpiece surface than said second position; said brake means arranged to be automatically actuated upon pivotal movement of the cutting means to said third position from said second position so as to prevent movement of said carriage relative to said guide rail when said cutting means is pivoted to said third position from said second position.

8. Apparatus as claimed in claim 7, including securing means for retaining the cutting means at said third position.

9. Panel saw apparatus for serially plunge cutting into a panel workpiece surface to cut a straight line comprising:
   a guide rail arranged to be removably secured to a workpiece surface in a predetermined position relative to a desired straight line of cut;
   a carriage mountable on said guide rail for engagement with and movement along said guide rail;
   a cutting means including a rotary disk cutting tool and a tool drive means pivotally mounted on said carriage, said cutting means arranged to pivot between a first or cutting position and at least a second position where the cutting tool is located away from the workpiece surface; and
   a brake means carried by said carriage and operatively connected to said cutting means, said brake means including a friction brake shoe arranged to be automatically actuated upon pivotal movement of the cutting means so as to engage said guide rail when said cutting means is pivoted to its first position, and to disengage said guide rail when the cutting means is pivoted to its second position, said carriage being braked against movement in either direction along said rail when said brake is engaged;
   actuator means operatively connected to said cutting means and brake shoe and moveable in response to pivotal movement of said cutting means to at least a first and second position corresponding to the first and second position of said cutting means;
   motion transmitting means between said actuator means and said brake shoe, for transmitting movement of said actuator means to the brake shoe, said motion transmitting means arranged to permit part of the movement of the actuator means to be not directly transmitted to the brake shoe.

10. The panel saw apparatus as claimed in claim 9, said lost motion means comprising a resilient means between the actuator means and the brake shoe means.

11. The panel saw apparatus as claimed in claim 9, said actuator means comprising a cam and cam follower connected between the cutting means and the brake shoe.

12. The panel saw apparatus as claimed in claim 9, said actuator means comprising a cam connected to the cutting means for pivotal movement therewith between said first and second positions, and a follower connected to said lost motion means.

13. The panel saw apparatus as claimed in claim 12, said lost motion means comprising Belleville spring means.

14. The panel saw apparatus as claimed in claim 12, said cutting means including a support shaft arranged to pivot between said first and second positions, said cam connected to said shaft for pivotal movement therewith.

* * * * *